United States Patent
Lo (10) Patent No.: US 8,897,212 B2
(45) Date of Patent: Nov. 25, 2014

(54) METHOD FOR ESTABLISHING A NETWORK CONNECTION AND NETWORK DEVICE THEREOF

(75) Inventor: Shih-Chieh Lo, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 896 days.

(21) Appl. No.: 12/333,291

(22) Filed: Dec. 11, 2008

(65) Prior Publication Data

US 2009/0168699 A1 Jul. 2, 2009

(30) Foreign Application Priority Data

Dec. 28, 2007 (TW) ................................ 96150884 A (51) Int. Cl.
*H04W 4/00* (2009.01)
*H04W 76/02* (2009.01)
*H04W 48/20* (2009.01)

(52) U.S. Cl.
CPC ............ *H04W 76/021* (2013.01); *H04W 76/02* (2013.01); *H04W 48/20* (2013.01)
USPC ........................................................ 370/328

(58) Field of Classification Search
CPC ..... H04W 84/12; H04W 12/06; H04W 48/20; H04W 4/005; H04L 63/08; H04L 67/2861
USPC ...................... 455/466, 461, 404.2, 465, 525; 709/229; 348/207.1, 207; 370/338, 370/310, 312, 329, 395.3, 432, 471, 370/474–475, 480
See application file for complete search history.

(56) References Cited

U.S. PATENT DOCUMENTS

| 7,526,296 | B1 * | 4/2009 | Lundy et al. | 455/461 |
| 7,606,209 | B2 * | 10/2009 | Watanabe | 370/338 |
| 2003/0134650 | A1 * | 7/2003 | Sundar et al. | 455/465 |
| 2004/0064591 | A1 | 4/2004 | Noble | |
| 2005/0054369 | A1 * | 3/2005 | Murakami | 455/525 |
| 2007/0081447 | A1 * | 4/2007 | Haustein et al. | 369/283 |
| 2007/0123209 | A1 * | 5/2007 | Sasao | 455/404.2 |
| 2007/0197237 | A1 * | 8/2007 | Powell et al. | 455/466 |
| 2010/0066839 | A1 * | 3/2010 | Azuma et al. | 348/207.1 |
| 2010/0217881 | A1 * | 8/2010 | Iino et al. | 709/229 |

FOREIGN PATENT DOCUMENTS

| CN | 1685663 A | 10/2005 |
| EP | 1 521 444 A1 | 4/2005 |
| TW | I246838 | 1/2006 |

(Continued)

OTHER PUBLICATIONS

Office action mailed on Jul. 4, 2011 for the Taiwan application No. 096150884, filing date Dec. 28, 2007, p. 1-4.

(Continued)

*Primary Examiner* — Obaidul Huq
*Assistant Examiner* — Syed M Bokhari
(74) *Attorney, Agent, or Firm* — Winston Hsu; Scott Margo (57) ABSTRACT

A method for establishing a network connection includes storing access point identifier information and connection information corresponding to the access point identifier information, establishing a network connection to a target access point, acquiring target identifier information of the target access point, determining whether the target identifier information conforms to the access point identifier information, and using the connection information to connect to a target electronic device through the target access point when the target identifier information conforms to the access point identifier information.

10 Claims, 6 Drawing Sheets

(56) References Cited

FOREIGN PATENT DOCUMENTS

| | | |
|---|---|---|
| TW | I254550 | 5/2006 |
| TW | I259700 | 8/2006 |
| TW | I266501 | 11/2006 |

OTHER PUBLICATIONS

Notice of Allowance mailed on Jul. 24, 2013 for Taiwan application No. 096150884, filing date Dec. 28, 2007, p. 1-4.

* cited by examiner

| Connection Information | First Server | Second Server | Third Server |
|---|---|---|---|
| Access Point Identifier Information | $SSID_1$ | $SSID_2$ | $SSID_3$ |
| Server Name | $SERVER_1$ | $SERVER_2$ | $SERVER_3$ |
| Server IP Address | $IP_1$ | $IP_2$ | $IP_3$ |
| Connection Port | $PORT_1$ | $PORT_2$ | $PORT_3$ |
| User Account | $ACCOUNT_1$ | $ACCOUNT_2$ | $ACCOUNT_3$ |
| User Password | XXXX | YYYY | ZZZZ |

FIG. 6

METHOD FOR ESTABLISHING A NETWORK CONNECTION AND NETWORK DEVICE THEREOF

BACKGROUND OF THE INVENTION

1. Field of the Invention

The present disclosure relates to a method for establishing a network connection and a related network device, and more particularly, to a method and related network device searching an access point identifier information conforming to a target identifier information according to the target identifier information, and utilizing a corresponding connection information to establish the network connection through a stored access point identifier information (such as SSID) and a connection information of a corresponding target electronic device (such as a server).

2. Description of the Prior Art

The Session Initiation Protocol (SIP) is a protocol that lets users accomplish voice communications on Internet through network communications equipment (such as mobile phones or PDAs). After the users utilize data accessing equipment (such as an access point), to logon a SIP server, applications such as Internet multimedia meeting, Voice over IP (VoIP), and multimedia distribution can be performed on the Internet.

Figure 1:
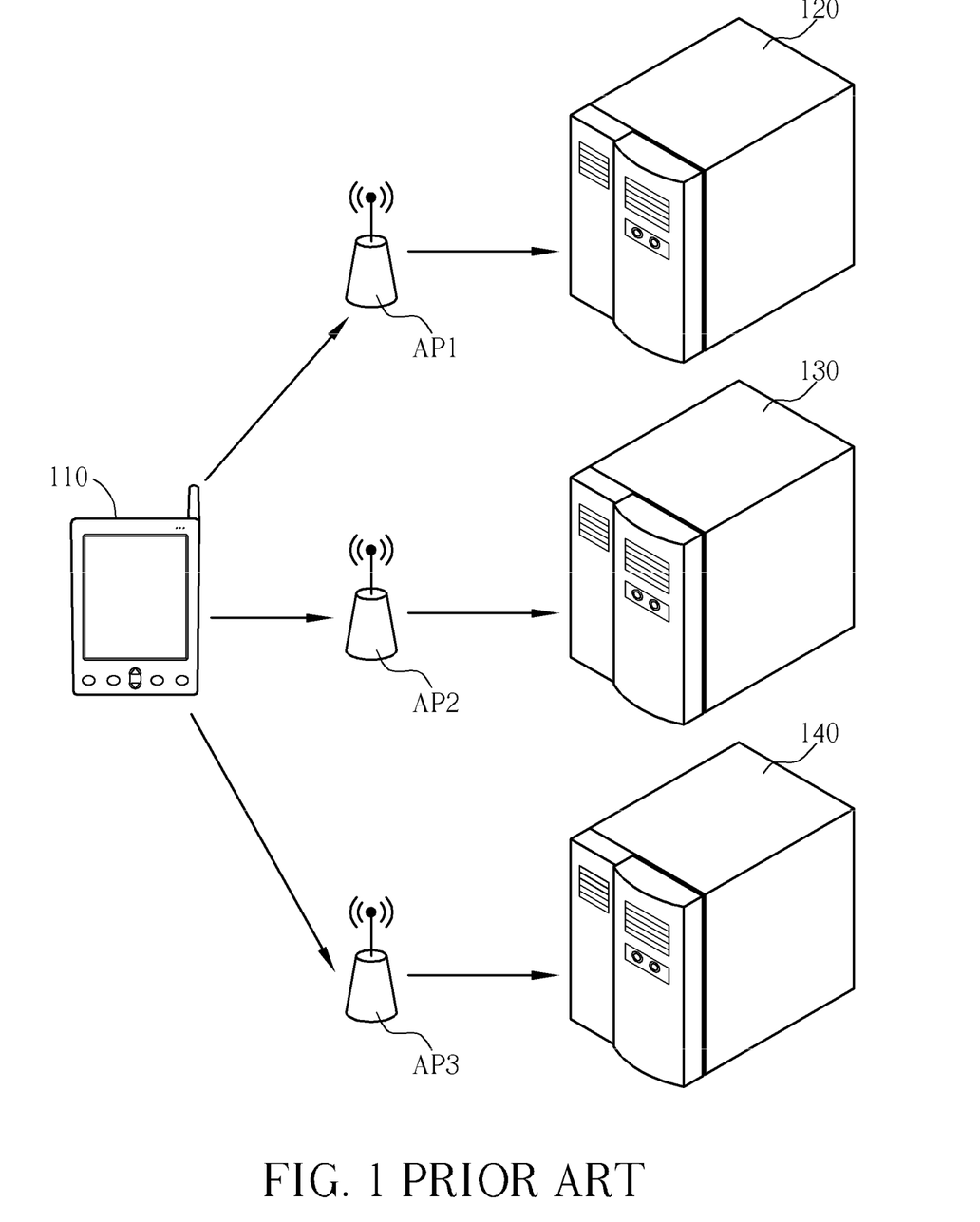
FIG. 1 is a diagram illustrating how a wireless network device logon to a server through access points according to the prior art.

Please refer to FIG. 1. FIG. 1 is a diagram illustrating how a wireless network device logs onto a server through access points according to the prior art. As shown in FIG. 1, when a wireless network device 110 wishes to connect to a network, it may logon to different servers by utilizing different access points in different places. For example, the wireless network device 110 can utilize a first access point AP1 to logon to a first server 120 provided by a company when the user is at the office, the wireless network device 110 can utilize a second access point AP2 to logon to a second server 130 provided by a telecommunications provider when the user is at home, or the wireless network device 110 can utilize a third access point AP3 to logon to a third server 140 provided by another telecommunications provider when the user is in a coffee shop. Therefore, the user needs to use different accounts and different passwords to logon to different servers. In other words, because the user always needs to connect to different servers in different places at different times, different accounts and different passwords must be inputted to logon to these servers, which causes unnecessary inconvenience to the user.

As a result, a faster, more convenient, and more economic network connection method and related network device is necessary. Therefore, the user can enjoy the convenience and pleasures brought about by accomplishing voice communications on the Internet.

SUMMARY OF THE INVENTION

It is one of the objectives of the present disclosure to provide a method for establishing a network connection and related network device to solve the abovementioned problems.

The present disclosure provides a method for establishing a network connection, which is applied to a network device. The method includes storing an access point identifier information and a connection information corresponding to the access point identifier information, establishing a network connection to a target access point, acquiring a target identifier information of the target access point, determining whether the target identifier information conforms to the access point identifier information, and using the connection information to connect to a target electronic device through the target access point when the target identifier information conforms to the access point identifier information.

In one embodiment, the target identifier information is a service set identifier (SSID).

In one embodiment, the target electronic device is a server.

The present disclosure provides a network device having a storage unit, a determining module, and a network connecting module. The storage unit is used for storing an access point identifier information and a connection information corresponding to the access point identifier information. The network connecting module is used for connecting to a target access point through a network connection. The determining module acquires target identifier information of the target access point through the network connecting module, and determines whether the target identifier information conforms to the access point identifier information. When the target identifier information conforms to the access point identifier information, the determining module utilizes the connection information to connect the network device to a target electronic device through the network connecting module and the target access point.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
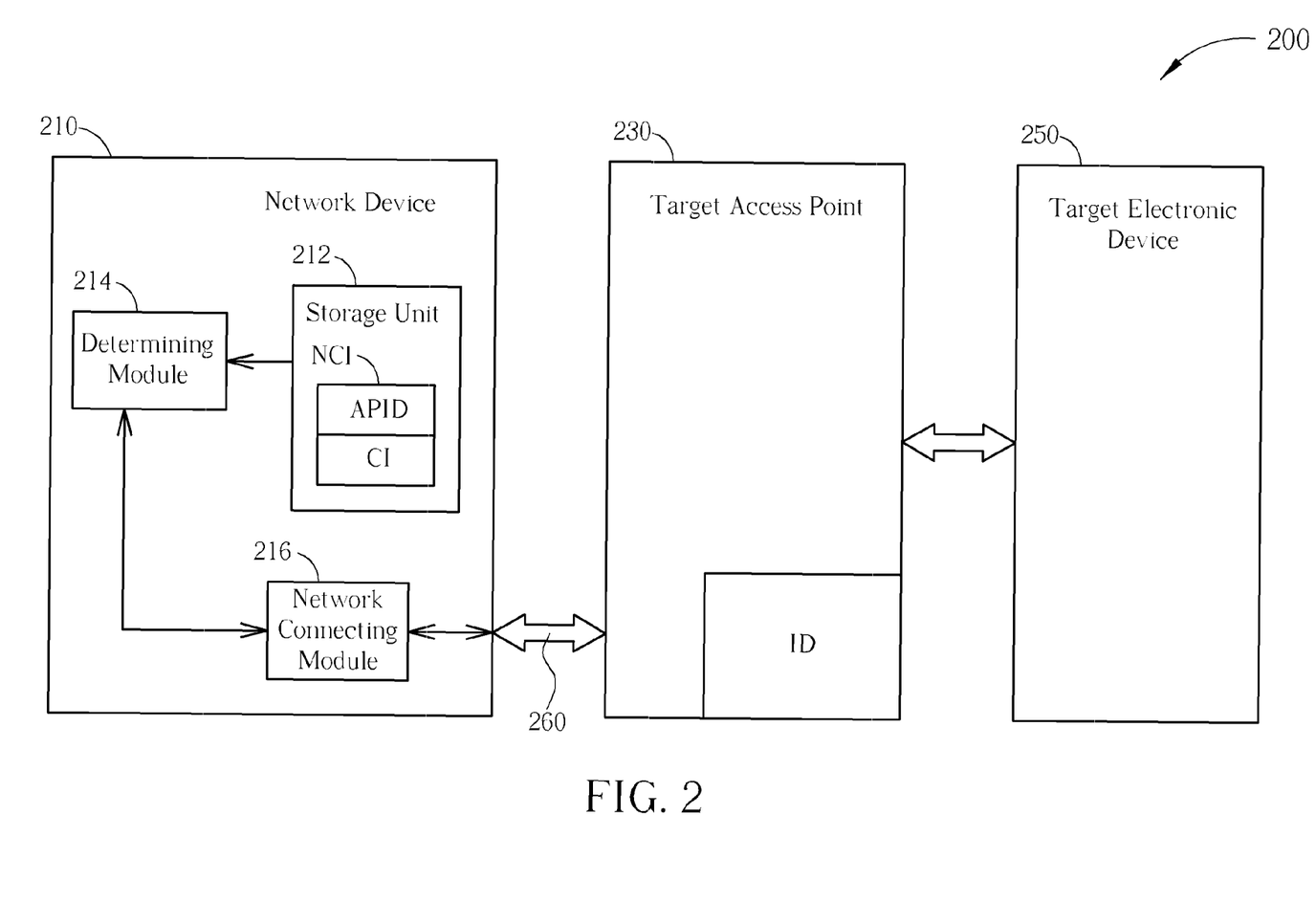
FIG. 2 is a diagram of a network device applied to a wireless network system according to an embodiment of the present disclosure.

Please refer to FIG. 2, which is a diagram of a network device 210 applied to a wireless network system 200 according to an embodiment of the present disclosure. The wireless network system 200 includes the network device 210 conforming to an embodiment of the present disclosure, a target access point 230, and a target electronic device 250. The target access point 230 has a target identifier information ID, such as a service set identifier (SSID), which is provided for the network device 210 to be identified during establishing a connection. The network device 210 includes a storage unit 212, a determining module 214, and a network connecting module 216. The storage unit 212 is used for storing an access point identifier information APID (such as the SSID) and a connection information CI of a target electronic device corresponding to the access point identifier information APID. In this embodiment, the storage unit 212 is disposed inside the network device 210. The network device 210 can be a mobile phone, a personal digital assistant (PDA), or a notebook computer, but is not limited to these only and can be in network devices of other types. The network device 210 utilizes the network connecting module 216 to connect to the target access point 230 through a network connection 260. After the determining module 214 acquires the target identifier information ID of the target access point 230 through the network connecting module 216, it determines whether the target identifier information ID conforms to an access point identifier information APID stored in the storage unit 212. When the target identifier information ID conforms to the access point identifier information APID, the determining module 214 utilizes the connection information CI corresponding to the access point identifier information APID to connect the network device 210 to the target electronic device 250 through the network connecting module 216 and the target access point 230.

Please note that the abovementioned target electronic device 250 can be a server, but is not limited to this only. In addition, the connection information CI can include information related to connecting and logging on to the server: for example, a server name, a server IP address, a connection port, a user account, and a user password. Those skilled in the art should appreciate that this should not be construed as a limitation of the present disclosure. In one embodiment, the server can provide services conforming to the Session Initiation Protocol (SIP). Therefore, after the users logon to a SIP server, applications such as Internet multimedia meeting, VoIP, and multimedia distribution can be performed on Internet.

Please also note that the storage unit 212 can be integrated or built inside the network device 210 in the embodiment above, but this is merely a practicable embodiment of the present disclosure. In other embodiments, the storage unit 212 can be an external device of the network device 210, such as a portable drive (such as Flash drive) or a memory card, which should also belong to the scope of the present disclosure.

Figure 3:
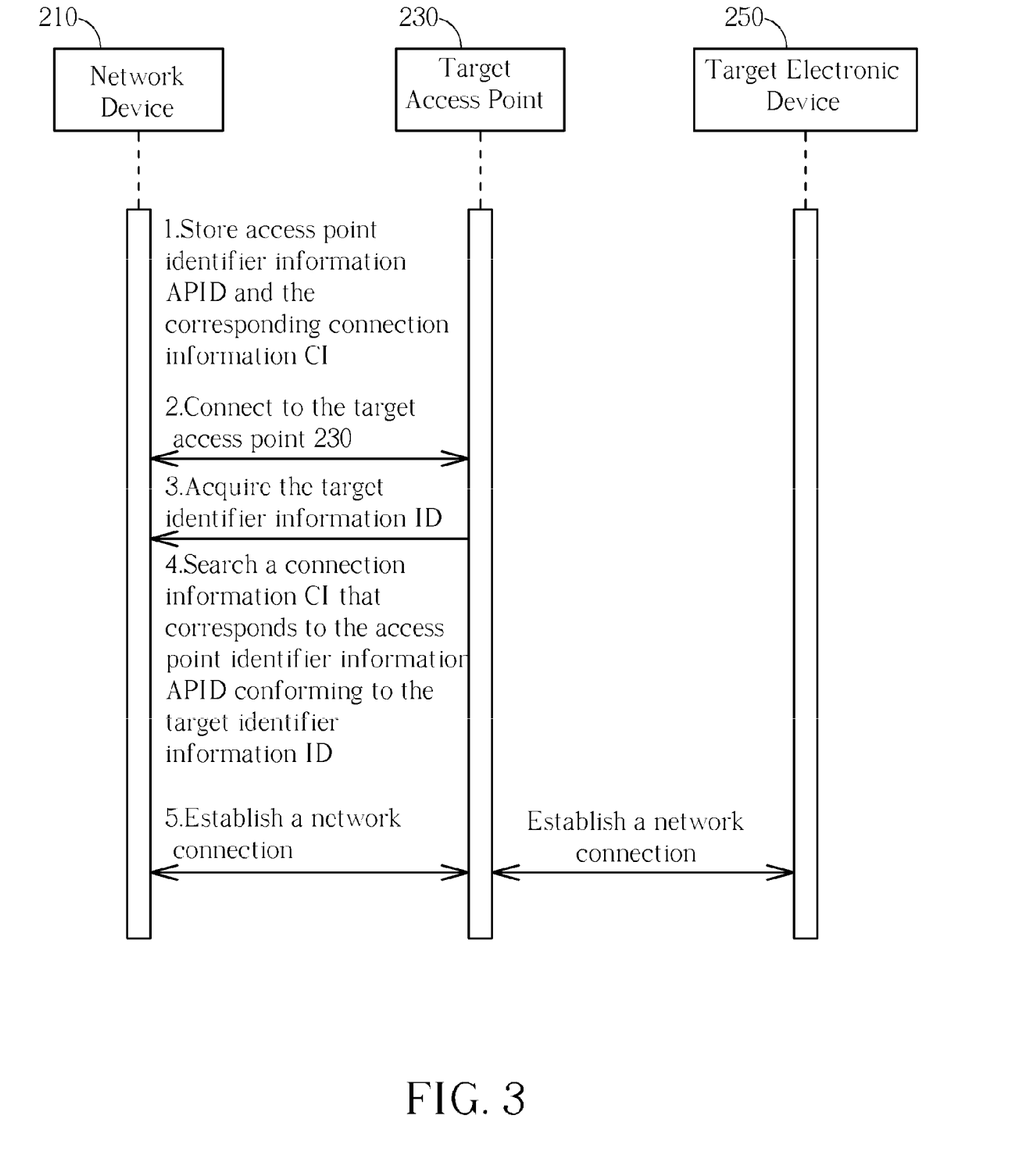
FIG. 3 is a diagram illustrating the interaction between the network device, the target access point, and the target electronic device of FIG. 2.

Please refer to FIG. 3. FIG. 3 is a diagram illustrating the interaction between the network device 210, the target access point 230, and the target electronic device 250 of FIG. 2. Please also refer to FIG. 2 in the following description. As shown in FIG. 3, the network device 210 first stores at least one access point identifier information APID and the corresponding connection information CI into the storage unit 212, and the network device 210 then connects to the target access point 230 through the network connection 260 to acquire the target identifier information ID of the target access point 230. At this time, the network device 210 searches and determines whether the target identifier information ID conforms to an access point identifier information APID. When the target identifier information ID conforms to the access point identifier information APID, the network device 210 utilizes the connection information CI corresponding to the access point identifier information APID to connect to the target electronic device 250 through the target access point 230.

Figure 4:
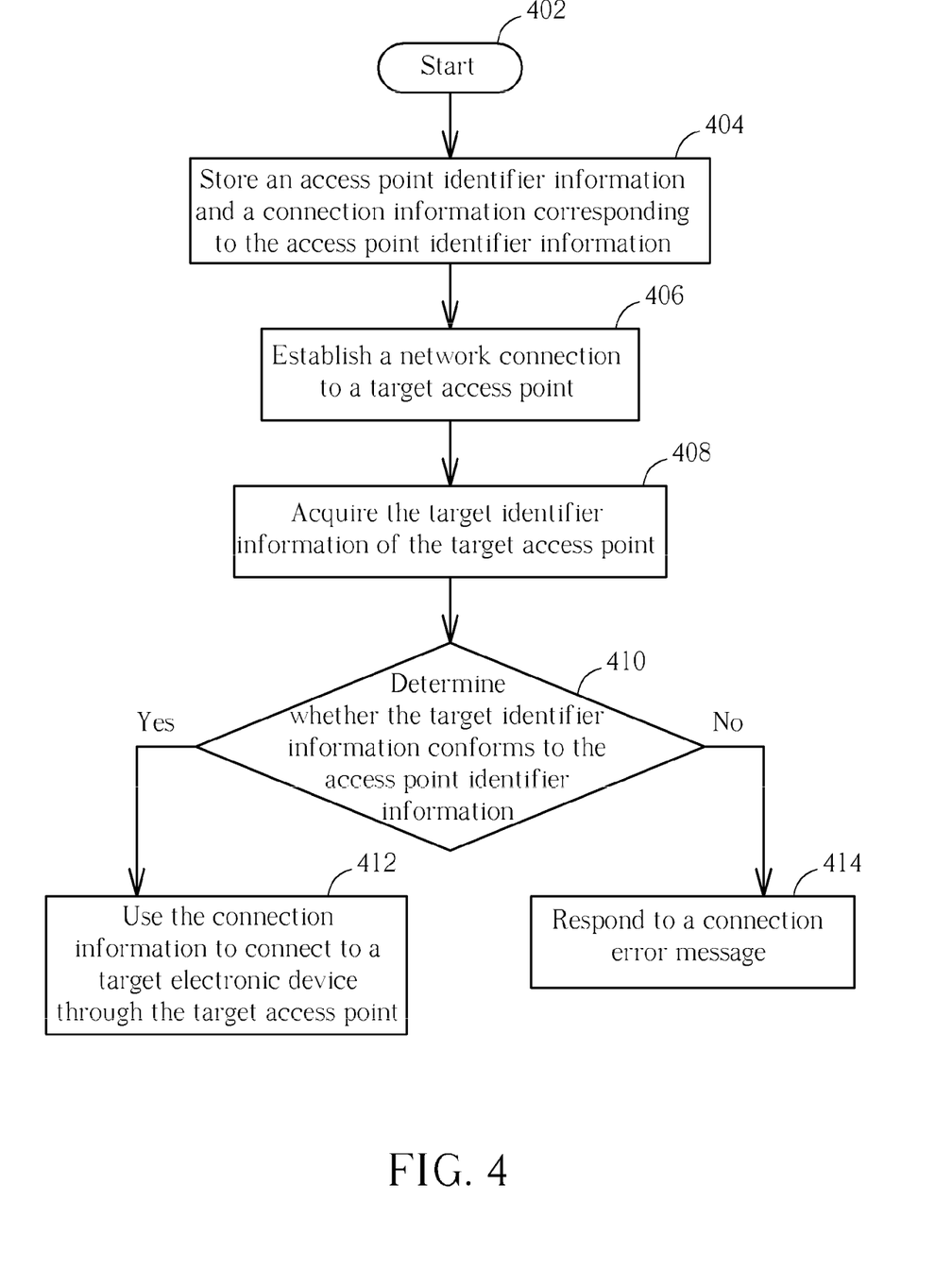
FIG. 4 is a flowchart illustrating a method for establishing a network connection according an exemplary embodiment of the present disclosure.

Please refer to FIG. 4. FIG. 4 is a flowchart illustrating a method for establishing a network connection according to an exemplary embodiment of the present disclosure. Please note that the following steps are not limited to being performed according to the exact sequence shown in FIG. 4 if a roughly identical result can be obtained. The method can be implemented in the network device 210 mentioned above and includes, but is not limited to, the following steps:

Step 402: Start.

Step 404: Store an access point identifier information and a connection information corresponding to the access point identifier information.

Step 406: Establish a network connection to a target access point.

Step 408: Acquire the target identifier information of the target access point.

Step 410: Determine whether the target identifier information conforms to the access point identifier information. If the target identifier information conforms to the access point identifier information, go to Step 412; otherwise, go to Step 414.

Step 412: Use the connection information to connect to a target electronic device through the target access point.

Step 414: Respond to a connection error message.

Please note that the operations of the wireless network system 200 have already been detailed above, and further description for the steps in FIG. 4 is omitted here for brevity. In addition, the steps mentioned above are merely an embodiment of the present disclosure, and in no way should be considered to be limitations of the scope of the present disclosure. These methods can include other intermediate steps or can merge several steps into a single step without departing from the spirit of the present disclosure. For example, Step 406 and Step 408 can be merged into a single step. Those skilled in the art should observe that various modifications of these methods may be made.

In the abovementioned embodiment, the wireless network system 200 is suitable for applications having a single target access point 230 and a single target electronic device 250, but this is not a limitation of the present disclosure. In other embodiments, the network system 200 can also be suitable for applications having a plurality of target access points and a plurality of target electronic devices. Those skilled in the art should know that numbers of the target access point 230 and the target electronic device 250 are not limited.

Figure 5:
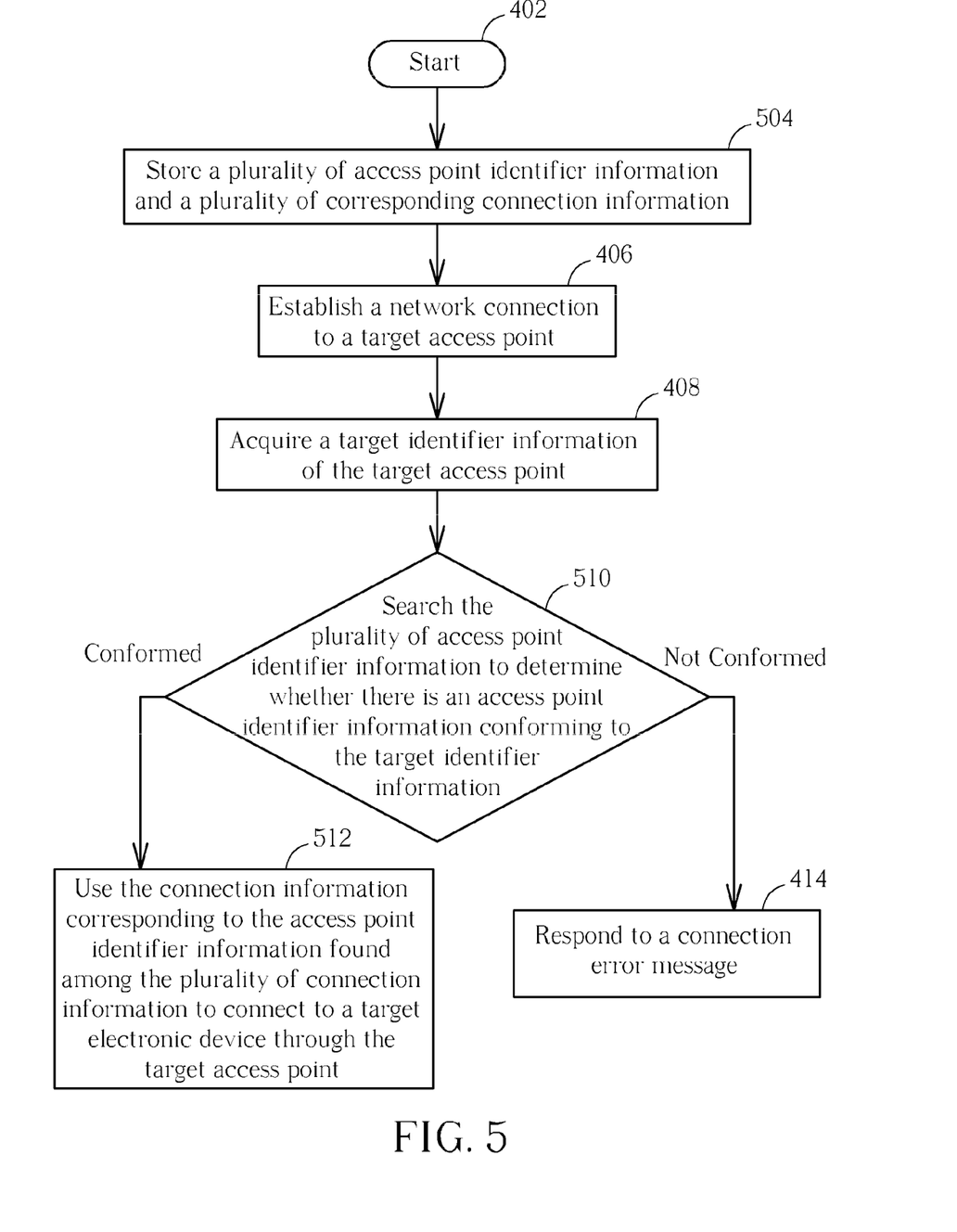
FIG. 5 is a flowchart illustrating a method for establishing a network connection according another exemplary embodiment of the present disclosure.

Please refer to FIG. 5, which is a flowchart illustrating a method for establishing a network connection according to another exemplary embodiment of the present disclosure. The method can also be implemented in the network device 210 mentioned above and includes, but is not limited to, the following steps:

Step 402: Start.

Step 504: Store a plurality of access point identifier information and a plurality of connection information corresponding to the plurality of access point identifier information.

Step 406: Establish a network connection to a target access point.

Step 408: Acquire a target identifier information of the target access point.

Step 510: Search the plurality of access point identifier information to determine whether there is an access point identifier information conforming to the target identifier information. When there is the access point identifier information conforming to the target identifier information, go to Step 512; otherwise, go to Step 414.

Step 512: Use the connection information corresponding to the access point identifier information found among the plurality of connection information to connect to a target electronic device through the target access point.

Step 414: Respond to a connection error message.

The steps shown in FIG. 5 are similar to that in FIG. 4. The difference between them is that the method in FIG. 5 is suitable for applications having a plurality of target access points and a plurality of target electronic devices. In Step 504, the network device 210 stores the plurality of access point identifier information APID and the plurality of corresponding connection information CI in the storage unit 212. After the network device 210 connects to the target access point 230 and acquires the target identifier information ID of the target access point 230 (Steps 406-408), it searches the plurality of access point identifier information to determine whether there is an access point identifier information APID conforming to the target identifier information ID (Step 510). When there is the access point identifier information APID conforming to the target identifier information ID, the network device 210 uses the connection information CI corresponding to the access point identifier information APID searched among the plurality of access point identifier information to connect to the target electronic device 250 through the target access point 230 (Step 512). When the access point identifier information APID conforming to the target identifier information ID is not found, the connection error message is relayed back to the network device 210 (Step 414).

Figure 6:
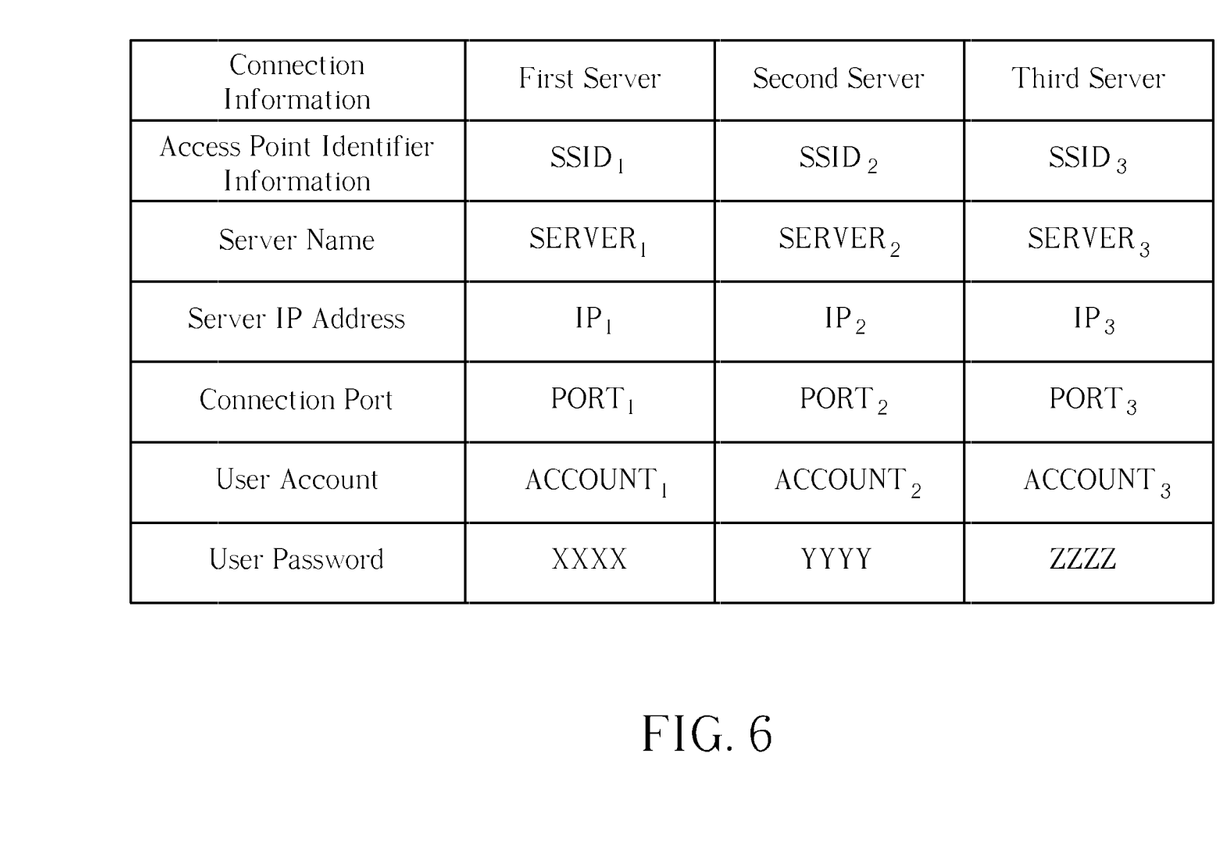
FIG. 6 is a diagram illustrating an example of information stored in the storage unit shown in FIG. 2.

Please refer to FIG. 6, which is a diagram illustrating an example of the access point identifier information APID and the connection information CI stored in the storage unit 212 shown in FIG. 2. As shown in FIG. 6, the storage unit 212 stores a plurality of access point identifier information (such as $SSID_1$, $SSID_2$, and $SSID_3$) and a plurality of connection information of target electronic devices (such as a first server, a second server, and a third server) corresponding to the plurality of access point identifier information. The connection information can include at least one or multiple data selected from a group consisting of a server name, a server IP address, a connection port, a user account, and a user password.

The abovementioned embodiments are presented merely for describing the present disclosure, and in no way should be considered to be limitations of the scope of the present disclosure. In summary, the present disclosure provides a method for establishing a network connection and related network device. By storing data including the access point identifier information (such as the SSID) and the connection information of its corresponding target electronic device (such as a server) in advance, a user can acquire the SSID of the access point and search for the connection information conforming to this SSID according to the SSID if he desires to logon to different servers using different access points. Therefore, the user can logon to servers easily and quickly by using the found connection information. In addition, because the access point identifier information and the connection information of the target electronic devices can be obtained easily and do not occupy much memory space or cost to store such information, the connection method disclosed in the present disclosure is really a convenient and economic solution.

Those skilled in the art will readily observe that numerous modifications and alterations of the device and method may be made while retaining the teachings of the invention.

What is claimed is:

1. A method for establishing a network connection, applied to a network device, the method comprising:
   establishing a network connection between the network device and a target access point;
   acquiring a target identifier information of the target access point after the network connection is established;
   searching a pre-stored plurality of access point identifier information to determine whether there is an access point identifier information conforming to the target identifier information, wherein the pre-stored plurality of access point identifier information corresponding to a pre-stored plurality of connection information, the pre-stored plurality of connection information each comprises a user account and a user password for connecting to a server, wherein the pre-stored plurality of access point identifier information and the pre-stored plurality of connection information are pre-stored in the network device; and
   automatically using the one of the plurality of connection information corresponding to the access point identifier information found among the pre-stored plurality of access point identifier information to logon the network device to the server through the target access point when there is the access point identifier information conforming to the target identifier information.

2. The method of claim 1, wherein the target identifier information is a service set identifier (SSID).

3. The method of claim 1, wherein the plurality of connection information each further comprises at least one of a server name, a server IP address, and a connection port.

4. The method of claim 1, wherein the server provides a service conforming to a session initiation protocol (SIP).

5. A network device, comprising: a storage circuit, for pre-storing a plurality of access point identifier information and a plurality of connection information corresponding to the plurality of access point identifier information, wherein the pre-stored plurality of connection information each comprises a user account and a user password for connecting to a server; a network connecting circuit, for connecting to a target access point through a network connection; and a determining circuit, for acquiring target identifier information of the target access point through the network connecting circuit after the network connection is established, and for searching the plurality of access point identifier information to determine whether there is an access point identifier information conforming to the target identifier information, wherein when there is the access point identifier information conforming to the target identifier information, the determining circuit automatically utilizes the one of the plurality of connection information corresponding to the access point identifier information found among the plurality of access point identifier information to logon to the server through the network connecting circuit and the target access point.

6. The network device of claim 5, wherein the target identifier information is a service set identifier (SSID).

7. The network device of claim 5, wherein the connection information each further comprises at least one of a server name, a server IP address, and a connection port.

8. The network device of claim 5, wherein the server provides a service conforming to a session initiation protocol (SIP).

9. A method for establishing a network connection, applied to a network device, the method comprising:
   establishing a network connection between the network device and a target access point;
   acquiring a target identifier information of the target access point after the network connection is established;
   searching a plurality of access point identifier information to determine whether there is an access point identifier information conforming to the target identifier information, wherein the plurality of access point identifier information corresponding to a plurality of connection information, the plurality of connection information each comprises a user account and a user password for connecting to a server; and
   automatically using the one of the plurality of connection information corresponding to the access point identifier information found among the plurality of access point identifier information to logon the network device to the server through the target access point when there is the access point identifier information conforming to the target identifier information;

wherein the access point identifier information and the connection information are still stored in the network device even if no network connection is requested to be established.

10. A network device, comprising: a storage circuit, for storing a plurality of access point identifier information and a plurality of connection information corresponding to the plurality of access point identifier information, wherein the plurality of connection information each comprises at least one following information for a server: a server name, a server IP address, a connection port, a user account, and a user password; a network connecting circuit, for connecting to a target access point through a network connection; and a determining circuit, for acquiring target identifier information of the target access point through the network connecting circuit after the network connection is established, and for searching the plurality of access point identifier information to determine whether there is an access point identifier information conforming to the target identifier information, wherein when there is the access point identifier information conforming to the target identifier information, the determining circuit automatically utilizes the one of the plurality of connection information corresponding to the access point identifier information found among the plurality of access point identifier information to logon to the server through the network connecting circuit and the target access point; wherein the access point identifier information and the connection information are still stored in the storage circuit even if no network connection is requested to be established.

\* \* \* \* \*